United States Patent [19]
Parks et al.

[11] Patent Number: 5,530,205
[45] Date of Patent: Jun. 25, 1996

[54] APPARATUS FOR SECURING BUS BARS TO SWITCHES IN ALTERNATIVE POSITIONS

[75] Inventors: David A. Parks, Baden; Arthur D. Carothers, Beaver Falls; Glen C. Sisson, Monaca; Michael J. Erb, Fombell, all of Pa.

[73] Assignee: Eaton Corporation, Cleveland, Ohio

[21] Appl. No.: 282,678

[22] Filed: Jul. 29, 1994

[51] Int. Cl.$^6$ .......................... H02G 5/00; H01R 13/434
[52] U.S. Cl. ...................... 174/99 B; 174/68.2; 361/611; 361/640; 439/751; 439/796; 439/807
[58] Field of Search ................. 174/68.2, 70 B, 174/71 B, 72 B, 88 B, 99 B, 133 B; 403/365, 366, 367, 369, 320, 362; 411/352, 353, 357, 358, 935, 935.1; 439/796, 807, 751, 733, 115, 116, 119, 207, 210, 212, 213, 214; 361/611, 615, 637, 640

[56] References Cited

U.S. PATENT DOCUMENTS 1,926,798  9/1933  Baumbach .................. 287/20
2,930,020  3/1960  Powell ........................ 439/64

OTHER PUBLICATIONS

Frame Book 29-103, p. 30; Westinghouse, Sep. 1986.

Primary Examiner—Michael L. Gellner
Assistant Examiner—John Chizmar
Attorney, Agent, or Firm—Martin J. Moran

[57] ABSTRACT

Rectangular bus bars alternatively engaged in either of a pair of crossed slots in a support block secured in a panel board are locked in place by a locking device incorporated in a cylindrical terminal portion of each bus bar. The locking device includes an expandable ring seated in a circumferential groove in the cylindrical terminal portion. A pair of actuating pins are urged radially outward in diametrically opposed bores to wedge the expandable ring against the support block, by a tapered screw threaded into a central longitudinal bore in the terminal portion of the bus bar.

11 Claims, 5 Drawing Sheets

5,530,205

1

APPARATUS FOR SECURING BUS BARS TO SWITCHES IN ALTERNATIVE POSITIONS

BACKGROUND OF THE INVENTION

1. Field of the Invention

This invention relates to bus bars in an electrical distribution system and particularly to bus bars with plug-in terminations for connection to electrical apparatus such as circuit breakers and other switches.

2. Background of Information

The rectangular bus bars in an electrical distribution system often have plug-in terminations for connection to electrical apparatus such as circuit breakers. It is known for the terminations to be supported in a support block secured to the panel board on which the circuit breakers are mounted.

Typically, the bus bars in a multiphase distribution system are arranged on edge in spaced parallel planes. However, in some installations, the bus bars are arranged to lie in a common plane. The support block has intersecting sets of notches for supporting the bus bars in the two alternative configurations. The bus bars are slipped into the appropriate set of notches from the switch side of the support block with the termination seated against a shoulder. A cotter pin is inserted in a through hole in the bus bar adjacent the other end of the support block to lock the bus bar in place.

The practice of using cotter pins to secure the bus bars in the support block does not produce a tight fit and is time consuming. In addition, turning the bus bars to the horizontal position so that they are in a common plane, reduces the clearance requiring that they be insulated. However, the use of cotter pins to fasten the bus bars to the support block requires penetration of the insulation which is not acceptable.

There is need, therefore, for a new arrangement for securing bus bars to support blocks in alternative configurations which is simple and easy to manufacture and use, and which does not require penetration of insulation on the bus bars where it is required.

SUMMARY OF THE INVENTION

This need and others are met by the invention which is directed to the combination of a bus bar having a non-cylindrical elongated portion, and a terminal portion at one end, and a support block for engaging the non-cylindrical elongated portion to affix the bus bar in a selected one of at least two different rotational positions with respect to a central longitudinal axis of the bus bar. The combination further includes locking means selectively radially expandable outward from the terminal portion of the bus bar for engaging the support block to lock the bus bar within the support block in the selected rotational position.

Preferably, the terminal portion of the bus bar is a cylindrical member and the locking means comprises a circumferential groove in the cylindrical member, an expandable ring seated in the circumferential groove, and actuating means within the cylindrical member selectively expanding the expandable ring radially outward into engagement with the support block. More particularly, the actuating means comprises a generally central longitudinal bore in the cylindrical member, at least two radial bores in the cylindrical member generally extending radially outward from the central longitudinal bore to the circumferential groove, locking pins radially slidable in the radial bores and an

2 actuating member movable longitudinally in the central longitudinal bore and engaging and urging the locking pins radially outward to expand the expandable ring radially outward. Preferably, the longitudinal bore is threaded and the actuating member is a screw threaded into the longitudinal bore and having a tapered end forming a camming surface which engages and slides the locking pins radially outward to expand the expandable ring.

Typically, the non-cylindrical portion of the bus bar is rectangular in cross-section and the opening in the support block in which the bus bar is received defines rectangular slots each having a cross-section for receiving the rectangular bus bar and oriented at the different rotational positions about the central longitudinal axis of the bus bar.

The invention is applicable to single phase and multiphase bus bar systems with or without neutral and/or for ground conductors.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be shown as applied to a three-phase electrical system; however, it will be apparent to those skilled in the art that the invention has application to single-phase and other multi-phase electrical systems as well as three-phase systems having a ground, and/or a neutral bus bar.

Figure 1:
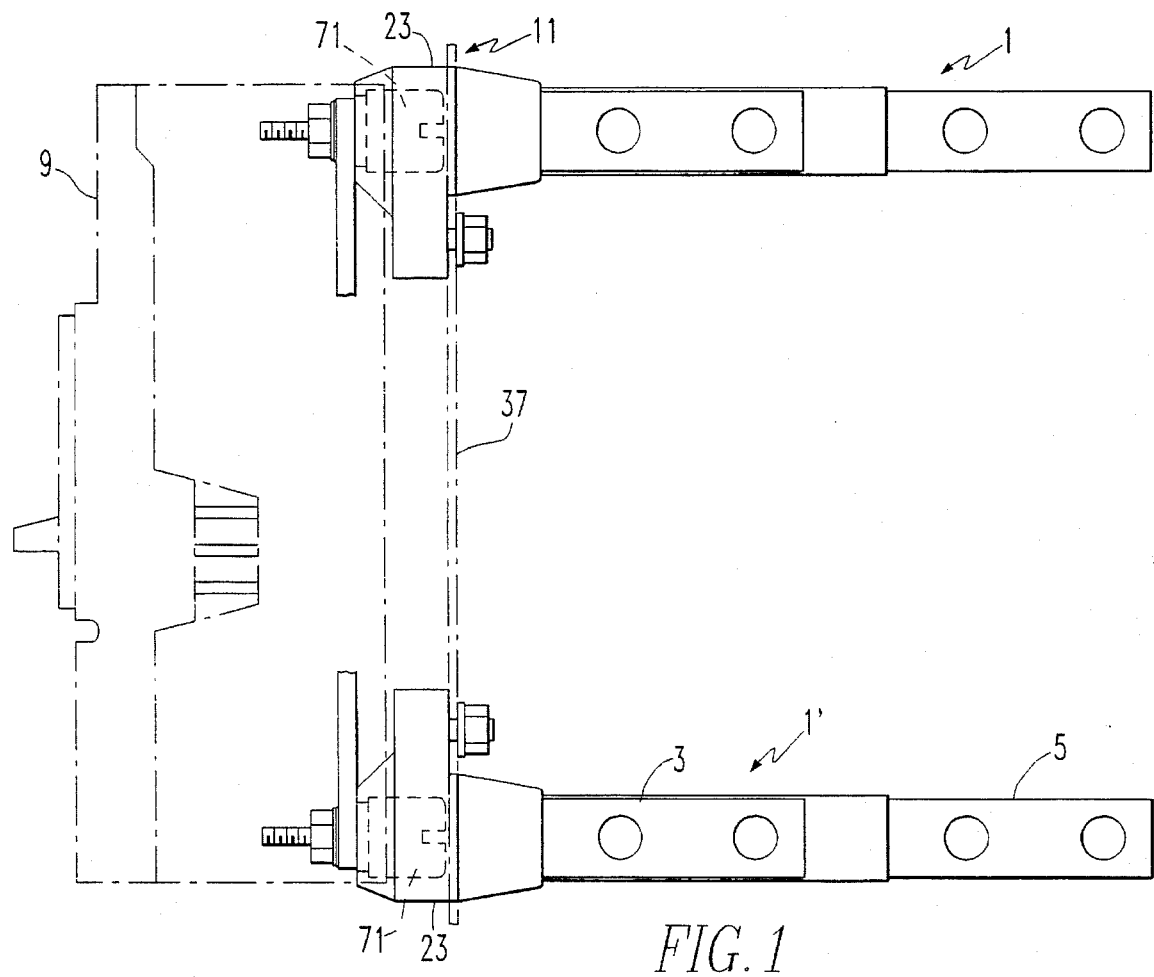
FIG. 1 is a side elevation view of a circuit breaker mounted in a panel board and connected to a bus bar system in accordance with the invention.
Figure 4:
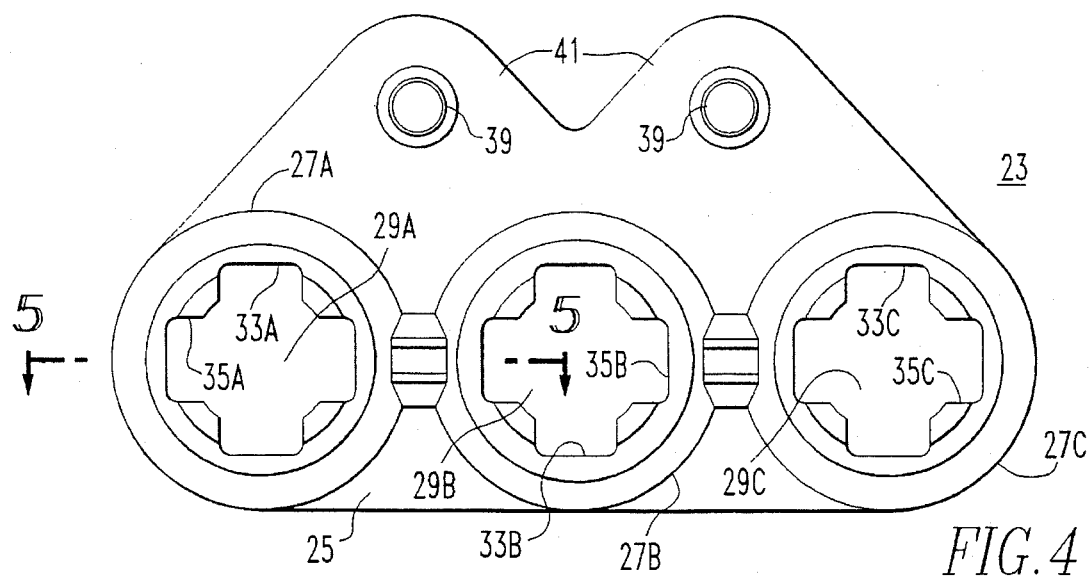
FIG. 4 is a front view of the support block shown in FIGS. 2 and 3.
Figure 2:
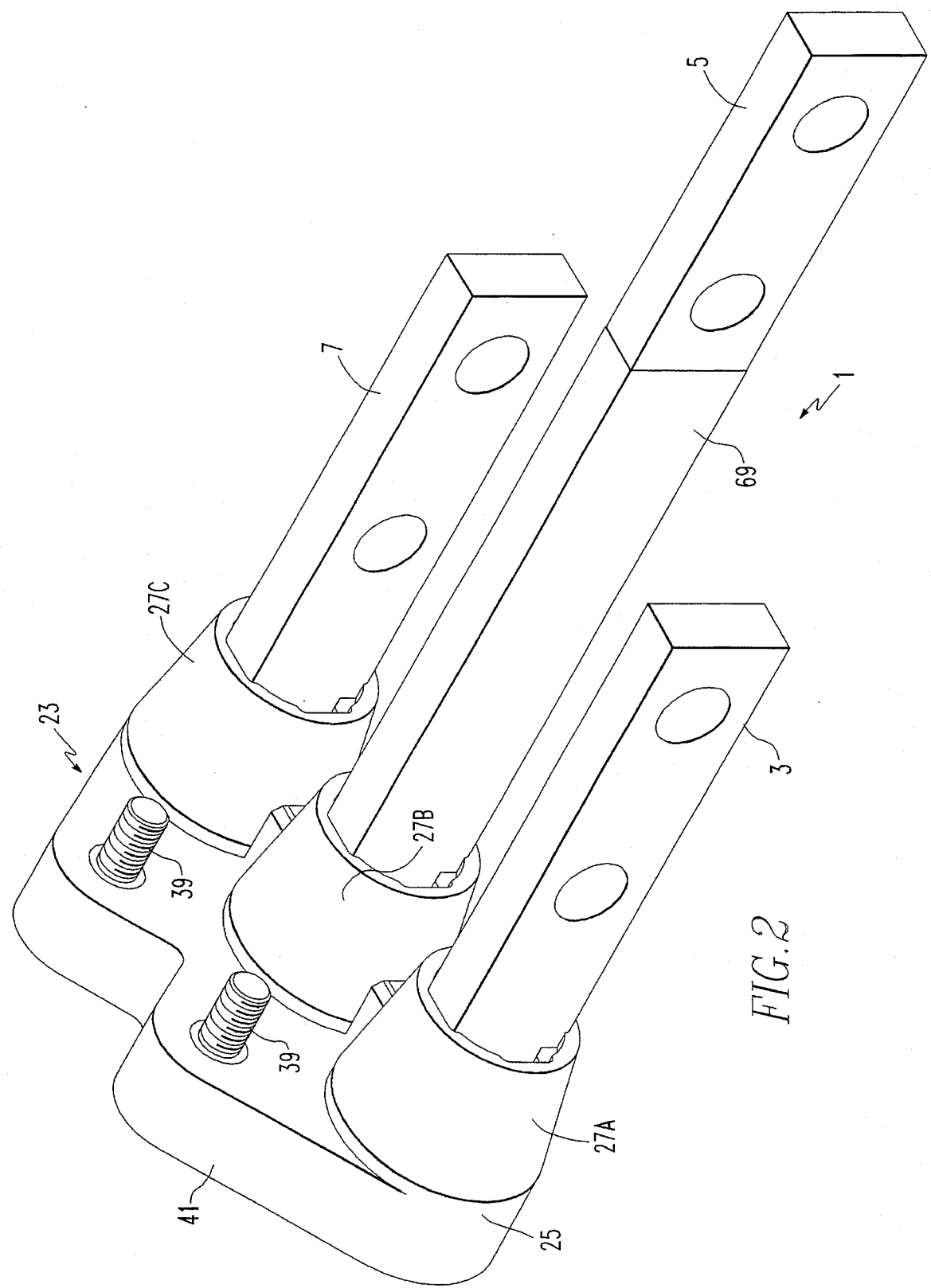
FIG. 2 is an isometric view of a three-phase bus bar system engaged within a support block in a first configuration in accordance with the invention.

Referring to FIGS. 1 and 2, a set of bus bars 1 for a three-phase electrical system includes a bus bar 3, 5 and 7, one for each phase. One set of bus bars 1 delivers powers from an external source (not shown) to a circuit breaker 9 mounted in a panel board 11 in a manner to be discussed. A set of load side bus bars 1' connects the circuit breaker 9 to a load (not shown).

Figure 3:
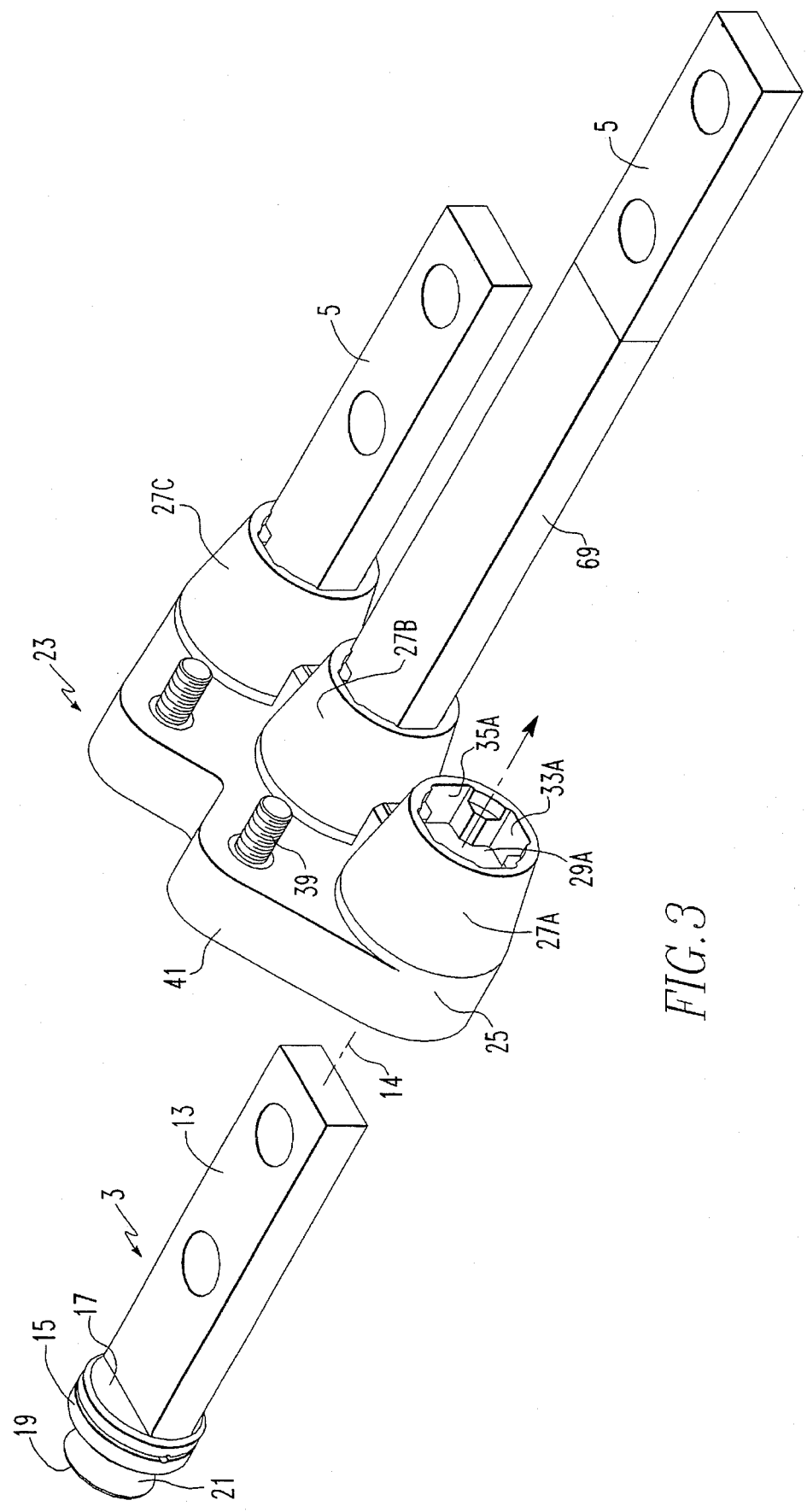
FIG. 3 is an isometric view similar to FIG. 2 of a second, alternative configuration of the three-phase bus bar system, with one bus bar shown in position to be inserted into the support block.
Figure 7:
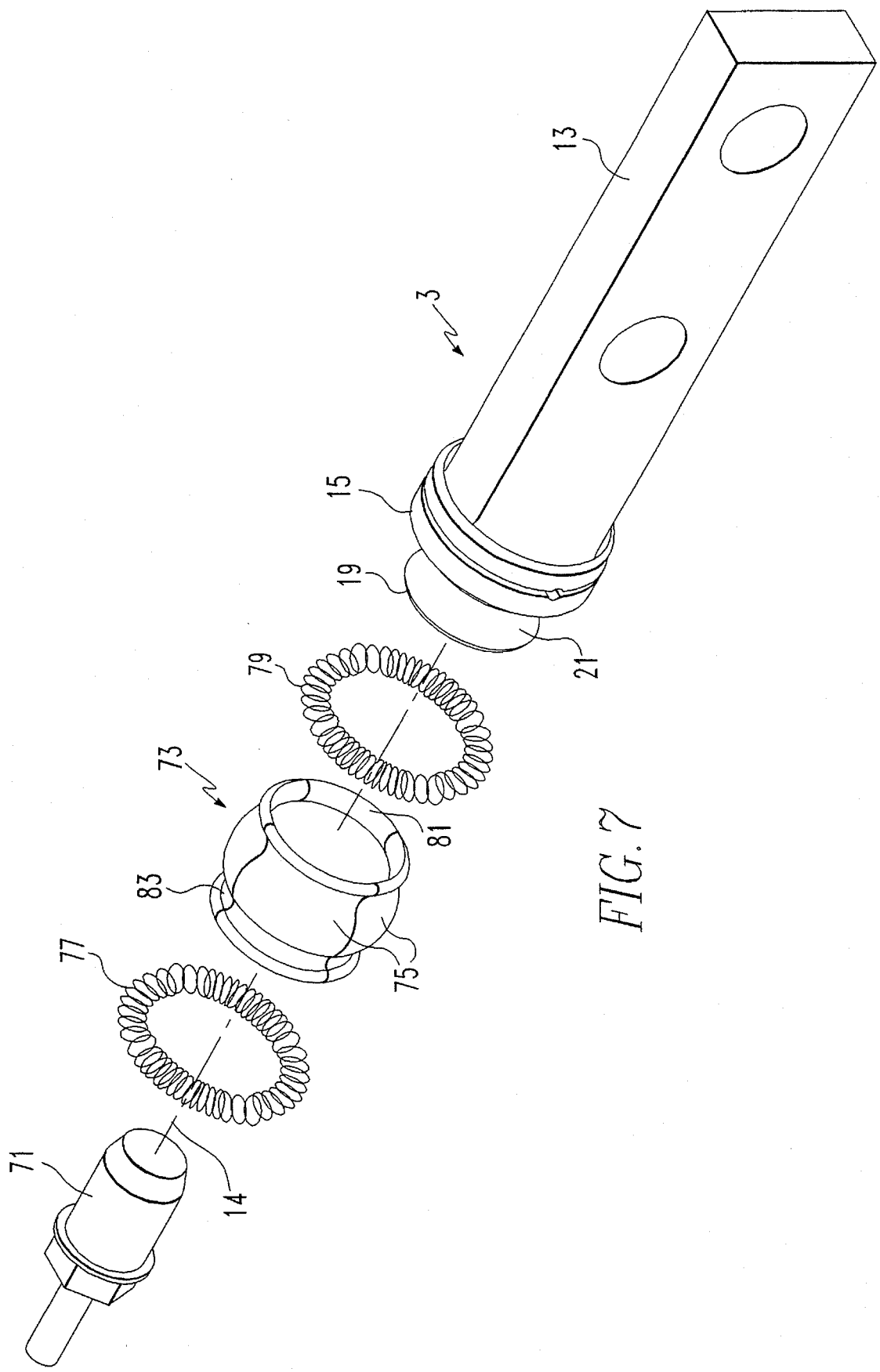
FIG. 7 is an exploded isometric view of a bus bar, a circuit breaker stab connector, and a coupling for engaging the bus bar and stab.

As shown in FIGS. 3 and 7, each of the bus bars, of which the bus bar 3 is exemplary, has a non-circular, rectangular elongated portion 13 with a longitudinal axis 14⁻, and a terminal portion 15 at one end of the elongated portion. The terminal portion 15 is cylindrical thereby forming a shoulder 17 where it joins the elongated rectangular portion 13. The free end 19 of the terminal portion 15 is of reduced diameter and has a circumferential groove 21 having a semi-circular cross-section.

As is shown in FIGS. 2 through 7, the bus bar 3 engages and is supported by a molded support block 23. The support block 23 has a base 25 supporting 3 bosses 27A, 27B and 27C in spaced relation. Openings 29A, 29B and 29C extend through the bosses 27A, 27B and 27C, respectively, and the base 25. These openings have a cylindrical section 31, 31B and 31C, respectively, extending from the base side 25. The openings 29A, 29B and 29C in the bosses 27A, 27B and 27C define crossed slots 33A, B and C and 35A, B and C each having a cross-section complimentary to the cross-sections of the bus bars 3, 5 and 7.

As is shown in FIG. 2, the support block 23 is secured to structural members 37 of the panel board 11 by threaded studs 39 extending from ears 41 on the base 25.

The bus bars 3, 5 and 7 can be mounted and supported by the support block 23 in one of two configurations. Typically, the bus bars 3, 5 and 7 are inserted through the opening 29A, B and C so that they engage the slots 33A, B and C, respectively as shown in FIG. 2. This supports the bus bars 3, 5 and 7 on edge in spaced parallel planes. In other installations, the bus bars 3, 5 and 7 lie in a common plane, in which case they engage the slots 35A, B and C as shown in FIG. 3.

Figure 5:
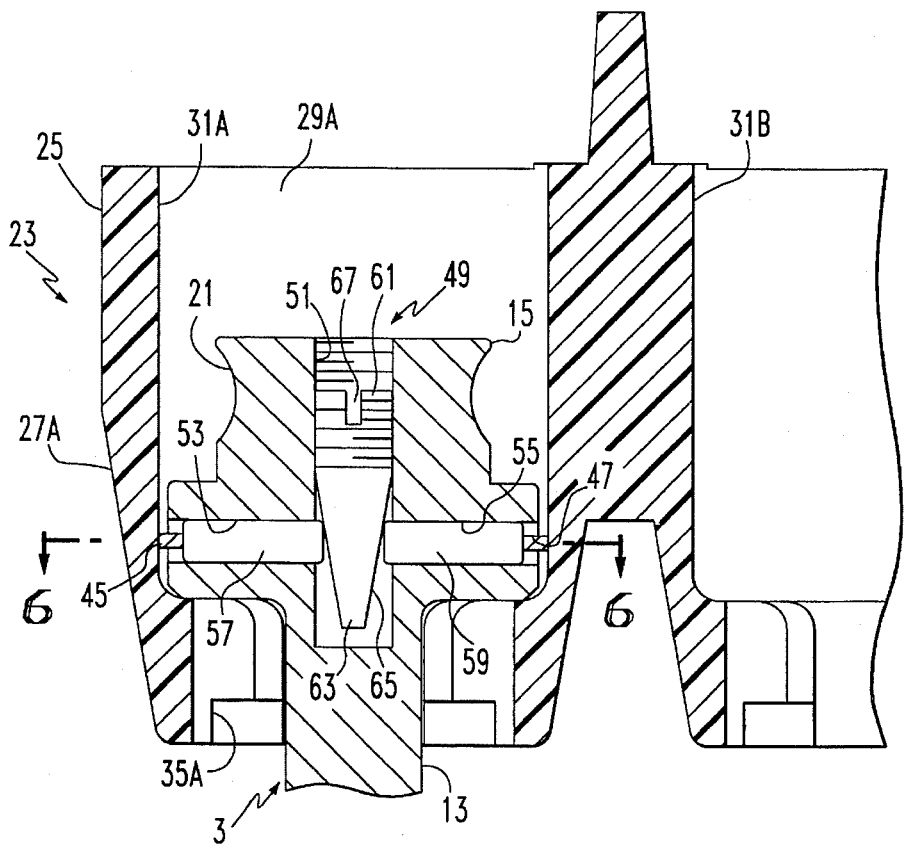
FIG. 5 is a cross-sectional view in enlarged scale through the support block of FIG. 4 taken along the line 5—5 and showing one bus bar locked in position.
Figure 6:
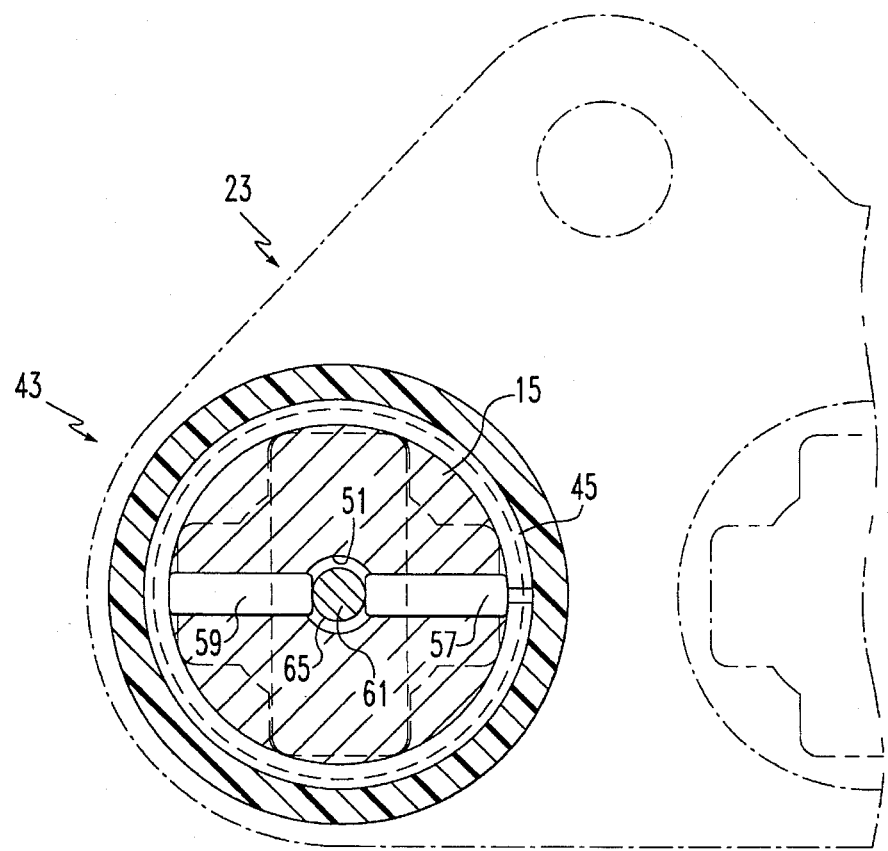
FIG. 6 is a cross-sectional view through a bus bar in accordance with the invention taken along the line 6—6 in FIG. 5.

As is shown in FIGS. 5 and 6, the bus bars are held fixed in the support block 25 by a locking device 43. This locking device includes a snap ring 45 which is seated in a circumferential groove 47 in the terminal portion 15 of the respective bus bar 3, 5 and 7. The expandable ring 45 is radially expanded by an actuating device 49 which includes a threaded central longitudinal bore 51 in the terminal portion 15 of the bus bar. Diametrically opposed bores 53 and 55 extend radially outward from the central longitudinal bore to the circumferential groove 47. A pair of actuating pins 57 and 59 are radially slidable in the bores 53 and 55, respectively, by an actuating member 61 in the form of a screw threaded into the central longitudinal bore 51. The screw 61 has a tapered end 63 forming a camming surface 65. The other end of the screw 61 has a recess 67 adapted to receive a tool such as a screw driver or a hex wrench, for instance.

As is also shown in FIGS. 5 and 6 the bus bar is inserted in the support block 23 in the desired slot 33 or 35. The screw 61 is then threaded into the bore 51 so that the camming surface 65 cams the pins 57 and 59 outward to expand the expandable ring 45 and wedge it into engagement with the cylindrical section 31 of the opening 29. This quickly and firmly locks the bus bar in the support block 23. No cotter pin is required, and hence, no penetrations are required through insulating sleeves 69 such as are shown in FIGS. 2 and 3.

As mentioned, the circuit breaker 9 has plug-in terminations for connection to the bus bar system 1. As shown in FIG. 7, the circuit breakers have male stabs 71 which are connected to the terminal portion 15 of the bus bars 3, 5 and 7 by a coupling 73. This coupling 73 comprises a tulip connection made up of 4 pedals 75 held together by annular springs 77 and 79. The pedals 75 form an annular collar 81 which expands as the coupling 73 is pushed onto the free end 19 of the terminal portion 15 and then engages the groove 21. A similar collar 83 on the other end of the pedals 75 expands to grip the stab 71.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the following claims and any and all equivalents thereof.

What is claimed is:

1. In combination:

a bus bar having a non-cylindrical elongated portion and a terminal portion at one end of said non-cylindrical elongated portion;

a support block for engaging said non-cylindrical elongated portion of said bus bar to fix said bus bar in a selected one of at least two different notational positions relative to said support block with respect to a central longitudinal axis of said bus bar; and locking means selectively radially expandable outward from said terminal portion of said bus bar for engaging said support block to lock said bus bar within said support block in said selected one of at least two different rotational positions.

2. The combination of claim 1 wherein said terminal portion of said bus bar is a cylindrical member and said locking means comprises a circumferential groove in said cylindrical member, an expandable ring seated in said circumferential groove, and actuating means within said cylindrical member selectively expanding said expandable ring radially outward into engagement with said support block.

3. The combination of claim 2 wherein said actuating means comprises a generally central longitudinal bore in said cylindrical member, at least two radial bores in said cylindrical member generally extending radially outward from said central longitudinal bore to said circumferential groove, locking pins radially slidable in said at least two radial bores and an actuating member movable longitudinally in said central longitudinal bore and engaging and urging said locking pins radially outward to expand said expandable ring radially outward.

4. The combination of claim 3 wherein said generally central longitudinal bore is threaded and said actuating member is a screw threaded into said threaded generally central longitudinal bore, said screw having a tapered end forming a camming surface which engages said lock pin and slides said locking pin radially outward to expand said expandable ring.

5. The combination of claim 4 wherein said expandable ring is a snap ring.

6. The combination of claim 5 wherein said non-cylindrical elongated portion of said bus bar is rectangular in cross-section and wherein said support block defines an opening formed by slots each having a cross-section complimentary to said rectangular cross-section of said elongated portion of said bus bar, a center concentric with said central longitudinal axis of said bus bar, and rotationally positioned about said central longitudinal axis at said different rotational positions.

7. In combination:

a plurality of bus bars each having a rectangular elongated portion and a terminal portion at one end of said rectangular elongated portion;

a support block having an opening for each of said bus bars, each of said openings being defined by at least two rectangular slots each having a cross-section for receiving said rectangular elongated portion of said bus bar, a center coincident with a central longitudinal axis of said bus bar and each slot at a different rotational position about said central longitudinal axis of the bus bar to fix each bus bar in one of two rotational positions;

and locking means associated with each bus bar each selectively radially expandable outward from the terminal portion of the bus bar for engaging said support block to lock the associated bus bar within said support block in said one rotational position.

8. The combination of claim 7 wherein said terminal portion of each bus bar is a cylindrical member and each locking means comprises a circumferential groove in the cylindrical member of the associated bus bar, an expandable ring seated in said circumferential groove, and actuating means within said cylindrical member selectively expanding said expandable ring radially outward into engagement with said support block.

9. The combination of claim 8 wherein each actuating means comprises a generally central longitudinal bore in said cylindrical member, at least two radial bores in said cylindrical member generally extending radially outward frown said central longitudinal bore to said circumferential groove, locking pins radially slidable in said radial bores and an actuating member movable longitudinally in said central longitudinal bore and engaging and urging said locking pins radially outward to expand said expandable ring radially outward.

10. The combination of claim 9 wherein each generally central longitudinal bore, and said actuating member is a screw threaded into said threaded generally central longitudinal bore, said screw having a tapered end forming a camming surface which engages said lock pins and slides said locking pins radially outward to expand said expandable ring.

11. The combination of claim 10 wherein each expandable ring is a snap ring.

* * * * *